United States Patent [19]
Hurst

[11] 3,773,179
[45] Nov. 20, 1973

[54] APPARATUS FOR TREATING WASTE FLUIDS BY MEANS OF DISSOLVED GASES

[75] Inventor: George E. Hurst, South Gate, Calif.

[73] Assignee: Pollution Control Engineering, Inc., Downey, Calif.

[22] Filed: Sept. 28, 1971

[21] Appl. No.: 184,336

[52] U.S. Cl.................. 210/194, 210/221, 210/322
[51] Int. Cl............................................. B01d 21/24
[58] Field of Search.................... 210/194, 195, 258, 210/294, 319, 320, 322, 221

[56] References Cited
UNITED STATES PATENTS

| | | | |
|---|---|---|---|
| 1,211,828 | 1/1917 | Dorr | 210/258 |
| 1,381,615 | 6/1921 | Beeby | 210/320 |
| 2,713,026 | 7/1955 | Kelly et al. | 210/221 |
| 2,679,477 | 5/1954 | Kivari et al. | 210/221 X |

Primary Examiner—John Adee
Attorney—Charles G. Lyon et al., Fred Wiviott and Ralph G. Hohenfeldt

[57] ABSTRACT

Apparatus for treating waste water and the like to remove suspended pollutants therefrom comprising a tank having a plurality of compartments wherein the fluid is repeatedly pumped from one compartment to the next. At each pumping station, gas is injected at the suction side of the pump and back pressure is maintained in the discharge line to force more gas into solution. Effluent from each compartment is taken near the bottom and the discharge is located midway of the height, confined to a small area and then deflected by a deflector plate. Clarified water is removed by a riser tube from the bottom of the final compartment and flows over a weir. The floated matter is removed from the fluid surfaces in each compartment by skimming or other known methods.

7 Claims, 4 Drawing Figures

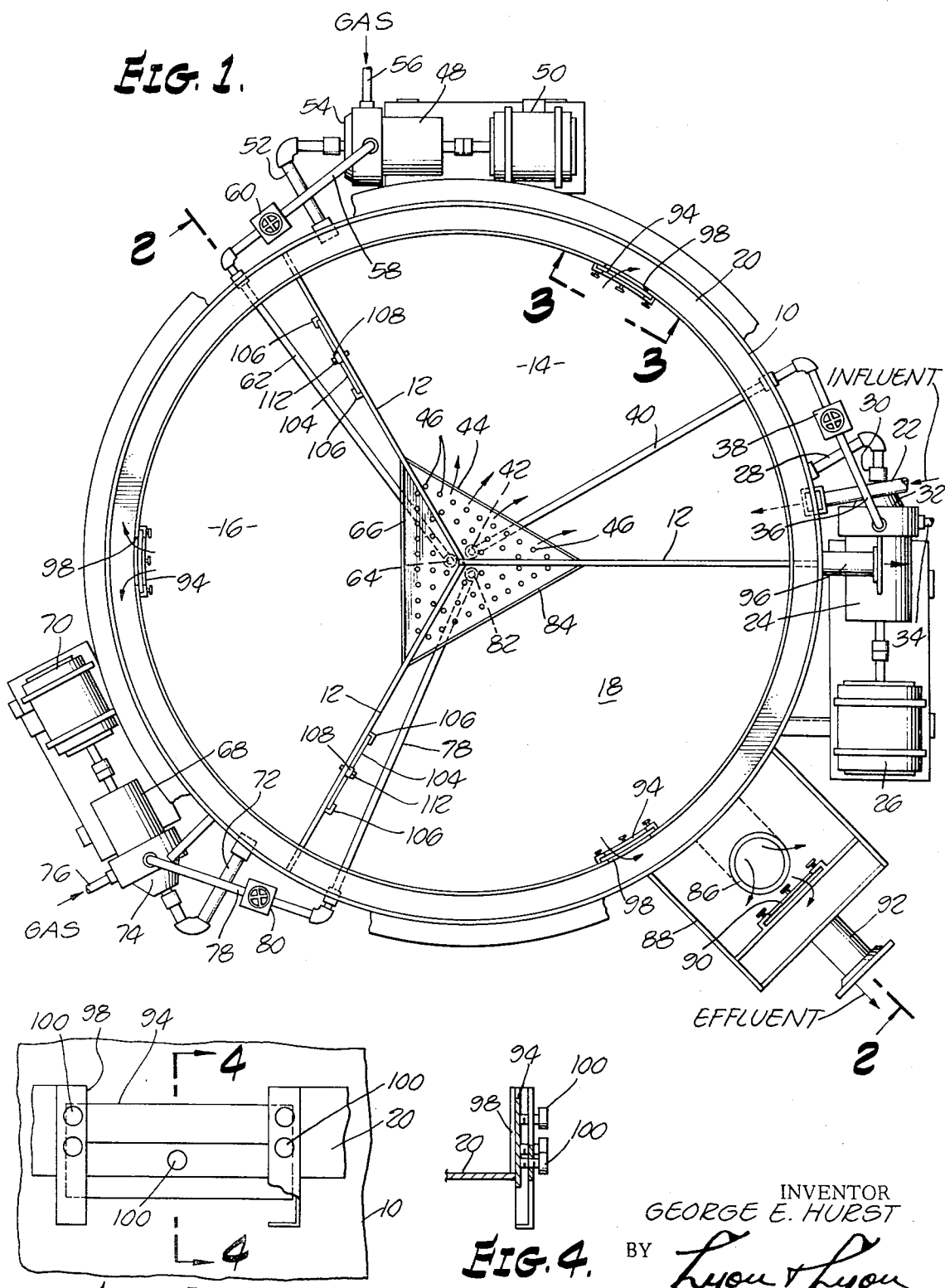

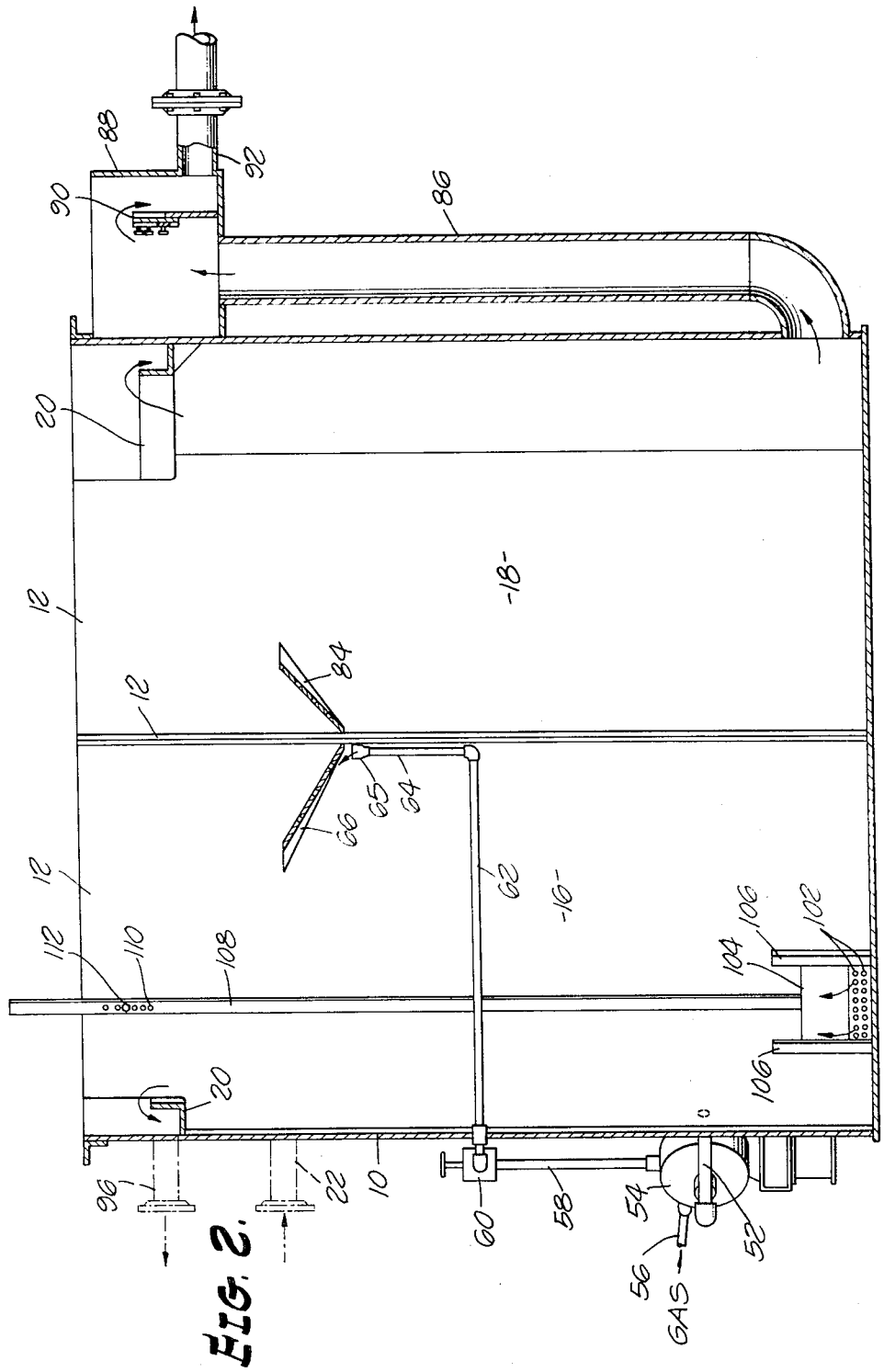

APPARATUS FOR TREATING WASTE FLUIDS BY MEANS OF DISSOLVED GASES

BACKGROUND OF THE INVENTION

This invention relates to improvements in gas flotation systems, and particularly is adapted to industrial and municipal waste water disposal systems. The principle of gas flotation is not new as a method of removing suspended matter from various fluids and the principle has been applied to the separation both of oil and solid matter. An example of the prior art in this field can be found in the U.S. Pat. to Robert A. Baum No. 2,746,605 issued May 22, 1956. The difficulty with all previously known systems has been their inability to adequately clarify water to reduce the content of pollutants to a sufficiently low level in terms of parts per million, and this has been particularly so where the flow rate of the waste water is appreciable.

SUMMARY OF THE INVENTION

The present invention provides an improvement in apparatus of the type described by pumping the water to be treated a number of times from different compartments of a flotation tank. The flow of water can be relatively smaller and at each pumping operation more gas can be injected into the flow so that more gas is forced into solution than could be obtained with a large flow through a single pump. The discharge into each tank compartment is confined to a relatively small area as well and then is discharged against a deflector plate which actually scrubs the oil or suspended matter out of the waste water. The oil or suspended matter which is caused to float in each compartment is then removed from the surface either by a continuous belt skimmer, by passing it over a weir or using a moving skimmer arm and the clarified water is removed from the bottom of the final compartment. In the first compartment fluid is withdrawn, gas is injected into the flow, and then it is returned to the same compartment and discharged against a deflector plate. A second pump takes fluid from the first compartment and discharges it into the second compartment and a third pump takes fluid from the second compartment and discharges it into the third compartment. At the point of gas injection, flocculent materials can also be introduced if necessary.

It is an object, therefore, of the present invention to provide an improved waste water treatment system.

More specifically, it is an object of the present invention to provide an improved waste water treatment system making use of multiple pumping and gas injection steps within a single tank consisting of a number of compartments whereby the dissolution of gas into the fluid is significantly enhanced so that flotation of oil or suspended matter is substantially complete.

DESCRIPTION OF THE DRAWINGS

FIG. 1 is a plan view of a multiple compartment flotation tank incorporating the features of the present invention.

FIG. 2 is a cross sectional elevation of the tank taken along line 2—2 of FIG. 1.

FIG. 3 is a partial elevation view of the weir gate taken along 3—3 of FIG. 1.

FIG. 4 is a sectional side view of the weir gate taken along line 4—4 of FIG. 3.

DESCRIPTION OF THE PREFERRED EMBODIMENT

The flotation tank shell is designated 10 in the drawings and is shown having three partitions 12 dividing the tank into three compartments. The first compartment is numbered 14, the second 16 and the third 18. Although the flotation tank here is shown as being of a cylindrical configuration and is shown having only three compartments, it will be obvious after reading the ensuing description that the tank could be made in other configurations and could have a number of compartments other than three. An oil collection trough 20 is formed around the interior periphery of the tank shell 10, extending continuously thereabout near the top of the tank.

Waste water to be treated is pumped into compartment 14 through the inlet 22. Feed at the inlet may or may not be pressurized depending upon the concentration of oil in the influent. Fluid with a high oil content should not be pressurized. A first pump 24 is mounted outside the tank 10 and equipped with a drive motor 26. A first suction line 28 is coupled to the suction side 30 of pump 24. Also on the suction side of pump 24 is a gas injector device 32 which introduces air or gas through line 34. The outlet line 36 from the pump is coupled through a pressure regulator 38 and extends back into compartment 14 through line 40 which extends substantially to the axial center of the tank where it is coupled to another line 42 extending vertically upward, the discharge end of which is positioned just below deflector plate 44. Deflector plate 44 is an angularly positioned plate perforated with a plurality of apertures 46 and extending between adjacent partitions.

A second pump 48 and drive motor 50 are stationed outside the tank 10 and suction line 52 is coupled into compartment 14, again near the bottom thereof. Suction line 52 is coupled through injector 54 which is in turn coupled into the suction side of pump 48. Air or gas is introduced into the injector through line 56. The discharge line 58 from pump 48 passes through a pressure regulator 60 and then extends radially inward to the center of the tank through line 62 where it again couples to a vertically rising line 64 the discharge end of which is positioned beneath a second deflector plate 66. Deflector plate 66 has the same configuration as deflector plate 44. A third pump 68 and its drive motor 70 are mounted outside the periphery of tank 10 rotationally spaced from the other two pump means. Suction line 72 is coupled into compartment 16 again near the bottom thereof and is coupled through injector means 74 to the inlet side of pump 68. Gas or air is injected through line 76 into the injector 74. The outlet from pump 68 is coupled to discharge line 78 which couples through pressure regulator 80 and again extends into the tank but this time into compartment 18 where it extends substantially to the central axis of the tank through a vertically directed conduit 82 the extreme end of which is positioned just beneath another deflector plate 84. At the discharge end of each discharge line 42, 64 and 82 the end is swagged or flared (see FIG. 2, 65) to slow the exit velocity of the fluid hitting the deflector plates. This reduction in velocity prevents a boiling action which otherwise occurs at the top of the deflector plates with a resultant loss of gas from solution. Clarified water is taken from compartment 18 through riser pipe 86 which extends exteriorly of the tank 10, coupling into the tank at the bottom or near the bottom of compartment 18. Riser pipe 86 is connected to a weir box 88 having an overflow weir 90 the height of which is adjustable. The effluent pipe 92 is connected to the weir box 88 on the overflow side of weir 90.

In each of the compartments 14, 16 and 18, an adjustable overflow weir 94 is provided between the tank compartment and the collection trough 20. Floated solid matter or oil is allowed to overflow into the trough 20 and is removed through outlet 96. FIGS. 3 and 4 show the details of the adjustable weir 94 which comprises a rectangular aperture 98 in the sidewalls of the trough 20 and by providing a number of thumb screws 100, the height of the weir gate 94 can be fixed as desired.

In other embodiments of the invention, the collection trough can be substituted by placing a continuous belt skimmer over the compartments. Continuous belt skimmers are well known in the art and therefore the details are not shown herein. Another means for removing floated matter from the surface can be a rotating top arm which discharges matter into a recovery chute. In this instance the three partitions 12 would be just below the surface of the water. Where a rectangular tank and rectangular comparments are used, it is contemplated that oil or solids be removed by revolving blades or by a continuous belt skimmer.

In each of the partitions 12 at the base there is provided a number of apertures 102 (see FIG. 2) which permit gravity flow of fluid from one compartment to the next. These apertures 102 may be closed by a gate 104 slideably mounted in guides 106. The gate 104 is attached to an actuating bar 108 which extends upwardly past the top of the tank. In order to hold the gate at a desired degree of opening, a number of apertures 110 may be formed in the bar 108 and corresponding apertures may be formed in the partition 12 to receive a pin 112 therein. The apertures 102 are in the nature of weep holes permitting the equalization of flow between the various compartments, compensating for differences in pumping velocity which naturally occurs between the independent pumps 24, 48 and 68. In addition, these weep holes permit the initial filling of the tank so that all compartments are equally filled when the unit is started up.

Some initial test figures of a unit constructed in accordance with this invention may help to indicate its improved performance. The unit was constructed to handle a flow rate of approximately 50 gallons per minute. At each pumping station gas was injected at a rate of about 10 cubic feet per hour. In this instance, the gas used was ordinary air. Back pressure maintained by the pressure regulators was 30 PSI. When operating at a slow rate of 25 to 30 gallons per minute the influent contained approximately 100 to 150 parts per million of oil and the outlet concentration varied in accordance with the concentration at the inlet, but was maintained below 30 parts per million, and in most cases below 20 parts per million. At increased flow rates of up to 35 gallons per minute the concentration increased somewhat at the outlet but again remained below 30 parts per million. The unit was also tested with the injection of alum as a flocculant and this caused a substantial decrease in the concentration at the outlet, the alum being in a water solution of a concentration of ¼ pound per gallon and being injected at a flow rate of 2 gallons per hour. This is a much lower level of flocculant usage than has been effective with prior systems, so the cost savings are apparent. With the flow rate increased in 50 gallons per minute and continuing the use of the alum flocculant, typical values at the outlet remain below 20 parts per million and in many cases were below 10 parts per million. It will thus be seen that the present invention has provided a waste water treatment facility which can reduce the concentration of pollutants substantially below minimum levels currently specified for the disposal of waste waters from corporate and municipal facilities.

While a particular embodiment of the present invention has been shown and described in addition to which alternative embodiments have been mentioned, it will be obvious to persons skilled in the art that other changes and modifications might be made without departing from this invention in its broader aspects, and it is the aim of the present invention to cover all such changes and modifications as far within the true scope and spirit of this concept.

I claim:

1. Apparatus for treating fluids to remove suspended pollutants therefrom, comprising:
    a tank having a plurality of contiguous compartments, a first one of said compartments having a fluid inlet therein, a last one of said compartments having a fluid outlet;
    pump means coupled to said first compartment for pumping fluid out of said first compartment and then discharging it back into the same compartment, further pump means for pumping fluid from compartment to compartment terminating with said last compartment, injector means coupled to each of said pump means for injecting gas under pressure into said fluid prior to the discharge thereof into a compartment whereby some of said gas is forced into solution;
    means mounted upon said tank for collecting floated pollutants from the surface of the fluid in each compartment; and
    means for removing clarified fluid from said last compartment through said fluid outlet.

2. The apparatus set forth in claim 1 further including conduit means coupled to the discharge side of each said pump means, each said conduit means extending into each compartment and having a discharge end stationed therein, deflector means mounted in each said compartment, the discharge end of each said conduit being directed toward said deflector means.

3. The apparatus set forth in claim 2 further including means mounted in each said conduit downstream of said pump means for creating back pressure in said conduit and said pump.

4. The apparatus set forth in claim 1 wherein said pollutant collecting means comprises an annular trough formed about the upper interior periphery of said tank, a plurality of adjustable weir gates stationed upon said trough each of said weir gates so positioned as to communicate each compartment with said trough, and an oulet means coupled to said trough.

5. The apparatus set forth in claim 1 wherein each of said compartments is separated by a partition, weep holes formed in each partition near the bottom of said tank.

6. The apparatus set forth in claim 4 wherein said means for removing clarified water comprises a riser, a weir box mounted at the top of said riser, an adjustable weir gate in said weir box whereby the level of fluid in said tank may be controlled consistent with the position of the aforesaid weir gates mounted on said trough.

7. The apparatus set forth in claim 2 wherein said deflector means comprises a planar member having a plurality of apertures therein, said member being mounted in said compartment intermediate the height thereof, said member being situated at an angle with respect to the vertical height of said tank.

* * * * *